G. T. SUNDELIN.
MEASURING APPARATUS FOR LIQUIDS.
APPLICATION FILED FEB. 20, 1911.

1,016,377.

Patented Feb. 6, 1912.
3 SHEETS—SHEET 1.

WITNESSES:
John H. Hoving
F. H. Logan

INVENTOR:
GUSTAF TEODOR SUNDELIN
by H. van Oldenneel
Attorney

COLUMBIA PLANOGRAPH CO., WASHINGTON, D. C.

G. T. SUNDELIN.
MEASURING APPARATUS FOR LIQUIDS.
APPLICATION FILED FEB. 20, 1911.

1,016,377.

Patented Feb. 6, 1912.
3 SHEETS—SHEET 2.

WITNESSES:
John H. Hoving.
F. H. Logan.

INVENTOR:
GUSTAF TEODOR SUNDELIN
by H. van Oldenneel
Attorney

G. T. SUNDELIN.
MEASURING APPARATUS FOR LIQUIDS.
APPLICATION FILED FEB. 20, 1911.

1,016,377.

Patented Feb. 6, 1912.

3 SHEETS—SHEET 3.

WITNESSES:
John H. Stoving
G. H. Logan

INVENTOR:
GUSTAF TEODOR SUNDELIN
by H. van Oldenneel
Attorney

UNITED STATES PATENT OFFICE.

GUSTAF TEODOR SUNDELIN, OF ROBERTSFORS, SWEDEN.

MEASURING APPARATUS FOR LIQUIDS.

1,016,377.     Specification of Letters Patent.     Patented Feb. 6, 1912.

Application filed February 20, 1911. Serial No. 609,706.

*To all whom it may concern:*

Be it known that I, GUSTAF TEODOR SUNDELIN, a subject of the King of Sweden, and resident of Robertsfors, in the Kingdom of Sweden, have invented certain new and useful Improvements in Measuring Apparatus for Liquids, of which the following is a specification, reference being had therein to the accompanying drawings.

This invention relates to a measuring apparatus for liquids, which consists of a vessel comprising two or more chambers of different sizes, which are each adapted for a certain quantity and can be filled and emptied individually, as required, by means of a cock or valve located at the top of the vessel, and a cock or valve located at the bottom of the vessel, as will be nearer described below.

Figure 1:
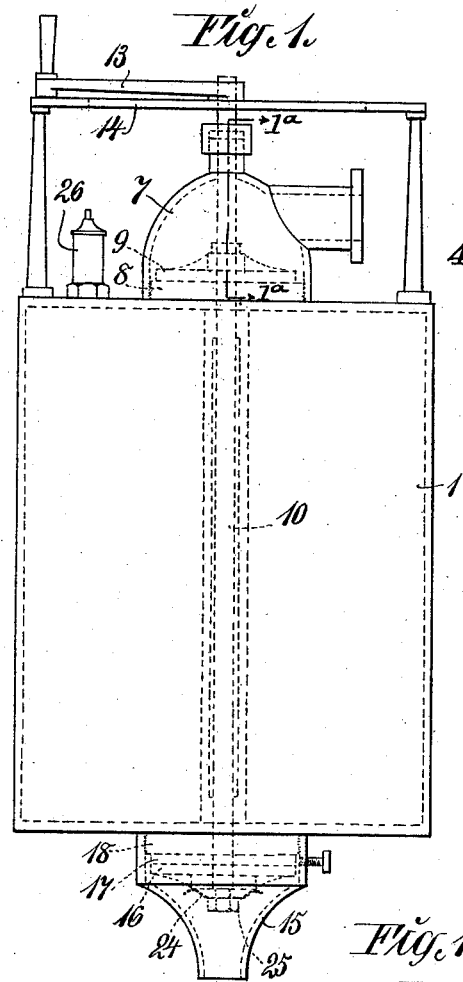
Figure 2:
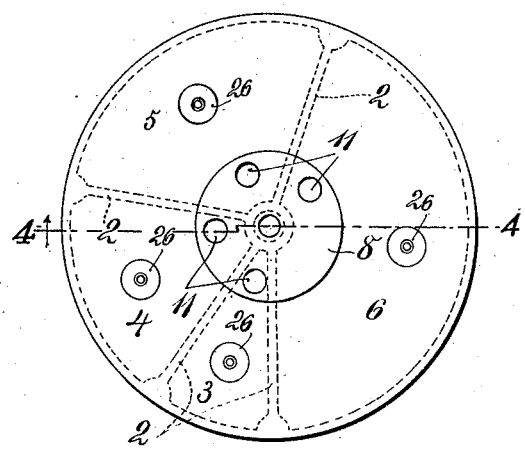
Figure 3:
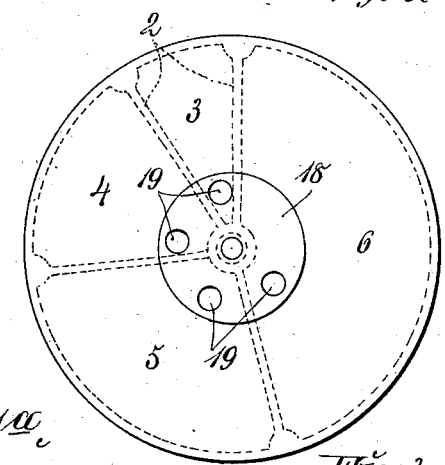
Figure 1C:
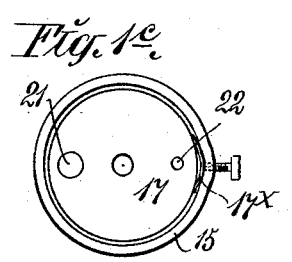
Figure 1A:
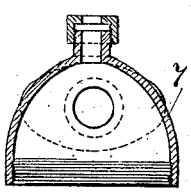
Figure 1B:
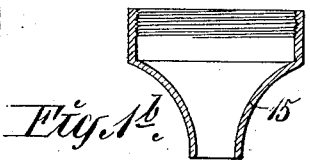
Figure 4:
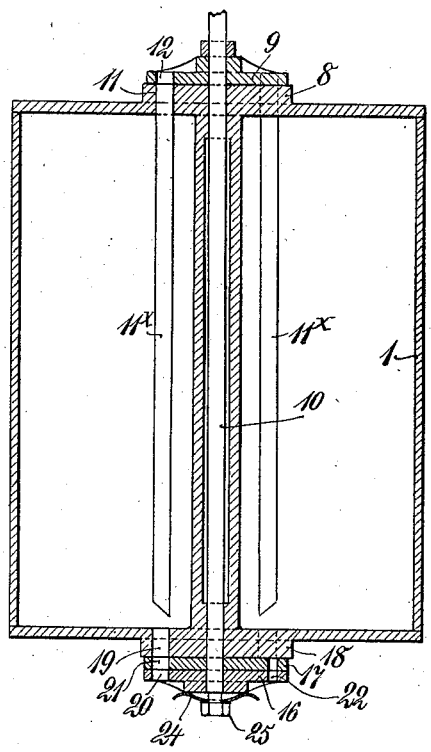
Figure 6:
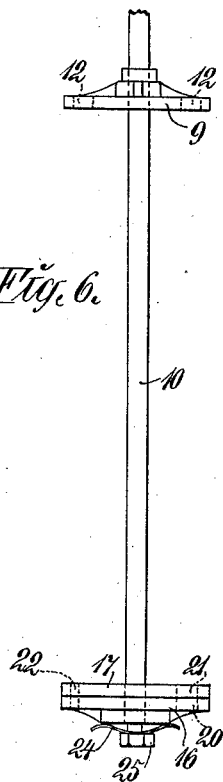
Figure 5:
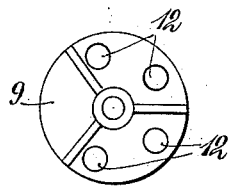
Figure 7:
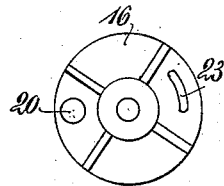
Figure 8:
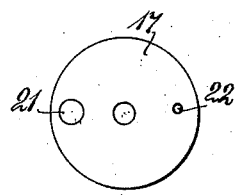
Figure 9:
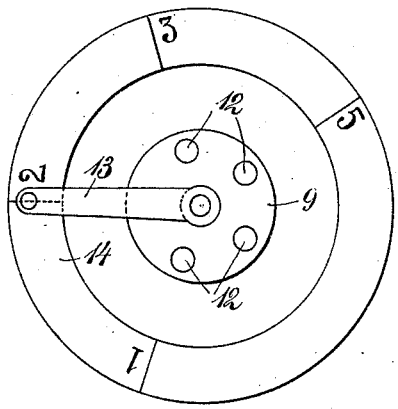
Figure 10:
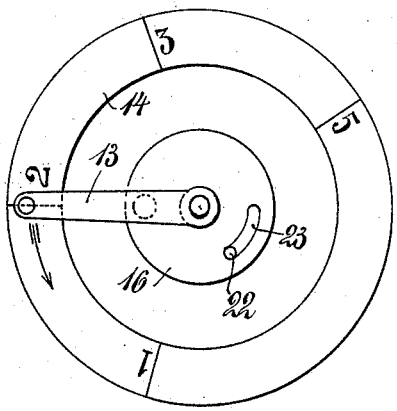
Figure 11:
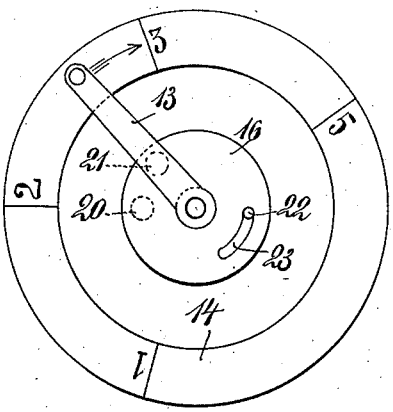
Figure 13:
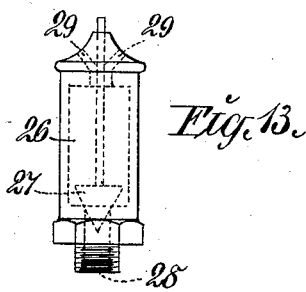
Figure 12:
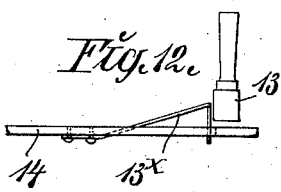

Figure 1 in the accompanying drawings is a side elevation of the apparatus, Fig. 2 shows a plan of the vessel viewed from the top and Fig. 3 shows the same viewed from below. In Figs. 2 and 3 certain exterior parts are omitted. Fig. 4 is a vertical section of the vessel taken on the line 4—4 of Fig. 2. Fig. 1ª is a vertical section of the top valve casing taken on the line 1ª—1ª of Fig. 1. Fig. 1ᵇ shows a central vertical section of the bottom valve casing. Fig. 1ᶜ shows a plan of the disk of the bottom valve. Fig. 5 shows a plan of the disk of the top valve. Fig. 6 shows a side view of the valve spindle with the disks fixed thereto. Figs. 7 and 8 show bottom views of the bottom valve disks. Figs. 9, 10 and 11 are plans of the apparatus showing different positions of the valve crank, certain parts being omitted, the apparatus being viewed from the top. Fig. 12 shows a side elevation of a locking device for preventing a backward movement of the valve crank. Fig. 13 shows a side elevation of an air valve.

The cylindrical vessel 1 is divided by vertical, radial partition walls 2 into several chambers as for instance four, designated by 3, 4, 5, 6 and holding for instance 1, 2, 3 and 5 liters respectively. The vessel is provided at its top end with a valve consisting of the casing 7, into which the liquid enters from the main vessel, of the valve disks 8 and 9, the lower one of which is firmly connected with the vessel and the upper one is rotatable and fixed to the valve spindle 10 passed through the same and serving also as the spindle of a similar valve located at the under side of the apparatus, Figs. 1 and 6. The disk 8 is provided with holes 11 leading to the chambers 3 to 6 inclusive, which holes are located each on four of the six radial lines which divide the disk into five equal sectors, and consequently there is no hole in one of said sectors as there are four holes only, Fig. 2. Tubes 11ˣ extend into the said chambers from the holes 11, as shown in Fig. 4. The top disk 9, Fig. 5, is also provided with four holes 12 located in such a manner, that they may register with each of the holes 11. A crank 13 is fixed to the top end of the spindle and below the same a graduated scale 14 is fixed to the vessel. The said crank is located above that part of the disk 9 which has no hole 12, see Fig. 9. If the crank has been placed above one of the figures of the scale corresponding to the holes 11, the passages 11—12 communicate with all chambers 3 to 6 inclusive except that chamber above which the crank is located.

As mentioned above, the apparatus is provided at its under side with a similar valve forming the outlet of the vessel and consisting of the spout 15, the two valve disks 16, 17 fixed to the spindle, and the stationary disk 18 fixed to the vessel and provided with holes 19, Fig. 3, corresponding to the holes 11. The two disks 16, 17, Figs. 7 and 8, have each only one hole 20, 21 respectively, the lower disk 16 being firmly connected with the spindle and so located that the hole 20, provided in the same, is located just below the crank. The top disk 17 can rotate on the spindle but a pin 22 fixed to one of the disks and engaging a slot 23 in the other disk causes the two disks to follow each other when the crank is rotated in one direction but, if the crank is rotated in the opposite direction the said pin permits the upper disk, against which a spring 17ˣ is bearing, to stand still while the crank is rotated through a certain angle determined by the slot 23. In one position of the disks 16, 17 the passage 20—21 is open, but in the other position it is shut, see Figs. 10 and 11. If the crank has been rotated in such direction, toward the right, that the disks have the position last mentioned it may be rotated for any further distance without any of the chambers being opened. Stopping springs 13ˣ are fixed to the scale, one at each figure, see Fig. 12, which springs the crank can cross freely in one direction, toward the right, but not in the other direction. If a quantity as for instance 2 liters, is to be measured off, the crank is rotated first toward the right past the corresponding figure for such distance that the hole 21 of the upper disk 17 has passed the outlet of this chamber 4, Fig. 11, and then backward to the stopping spring. The holes 20, 21 have then been moved into a position opposite each other and opposite the hole 19, while the upper hole 11 of the said chamber is shut. The chamber 4 is now emptied while the other chambers are filled. If the crank is rotated one or more steps past the spring or springs, the said chamber 4 holding two liters is again filled, and if the crank is rotated a whole revolution and the operations stated above are repeated the chamber is again emptied and so on. The spindle 10 is supported by the disk 9 by means of a collar and is provided at its lower end with a springy plate 24 bearing against the disks 16, 17 movable longitudinally of the spindle. The said springy plate can be set by means of the nut 25, so that the valve disks are forced sufficiently against each other. At the top of each chamber an outlet valve for the air is provided. The said valve, Fig. 13, consists of a conical float 27 which is guided vertically by a cylinder 26 and permits the air to escape through the openings 28, 29. The weight of the float is so adjusted, that it starts floating in the same moment as the liquid reaches the top side of its conical part which then closes the openings at the top of the cylinder just as the cylinder is filled.

The described apparatus may evidently be modified in many respects without departing from the idea of the invention.

Having now described my invention, what I claim as new and desire to secure by Letters Patent is:

1. In an apparatus for measuring liquids the combination of a plurality of chambers of different sizes, a fixed disk on the top of said chambers, a common top inlet valve, rotatable on said fixed disk and coöperating therewith and a common bottom outlet valve, a crank and a spindle common to the said valves for rotating the same, the top valve being provided with a plurality of passages arranged in such manner, that one of the chambers is shut off at its top from the main conduit while the other chambers are being filled, and the bottom valve being also provided with a plurality of passages and with an automatic cut-off-device arranged in such manner, that the shutting off is effected when the crank is rotated in one direction, forward, but when the crank is then rotated in the opposite direction, backward, the chamber, which is closed at its top, will be opened at its bottom and emptied.

2. In an apparatus for measuring liquids, the combination of a vessel comprising a plurality of chambers of different sizes, a fixed disk on top of said vessel, an inlet valve at the top of the said vessel and consisting of a disk movable on said fixed disk and fixed to a rotatable spindle provided with a crank, the said valve covering passages and tubes, forming continuations of said passages in the respective chambers, and provided with passages which, when the valve is rotated to a certain position, coincide with the said passages, except one of them which remains closed, and an outlet valve at the bottom of the said vessel, which valve has a spindle common to the upper valve and consists of two disks provided with passages and rotatable with relation to each other through a certain angle, but partaking in the rotary motion of the spindle, and which, when rotated in one direction, as the crank has been moved forward, have their passages shut off, but which, when rotated in the opposite direction, as the crank has been moved backward into a position determined by the chamber, which is to be emptied, open the outlet of the said chamber, which is simultaneously shut off at its top.

3. In an apparatus for measuring liquids, the combination of a vessel divided by radial partition walls into a plurality of chambers of different sizes and having an upper inlet valve common to the said chambers for the filling of the chambers simultaneously except one chamber which is shut off during the filling operation, a bottom outlet valve provided with an automatic cut-off device and a spindle common to the upper valve, for the emptying of the chambers individually, and a stationary, circular scale at the top of the vessel and a crank on the said spindle to be shifted according to the scale, the said scale being arranged in such manner that the crank can be moved into the position which is necessary for the desired chamber being emptied.

4. In an apparatus for measuring liquids, the combination of a vessel divided into a plurality of chambers of different sizes, an inlet valve at the top of the said vessel and an outlet valve at the bottom of the same, the said valves having a common spindle extending through the vessel and provided with a crank to be adjusted according to a scale located at the top of the vessel, springy catches (13×) permitting the crank to be rotated in one direction for an unlimited distance but in the opposite direction only to the next catch, the said valves being so arranged that, when the crank is rotated into the position last mentioned, all chambers, except one, are open at their top, for being filled from the main conduit, but are shut off at their bottom, so that when the crank is moved forward and then backward into the former position the lower valve of the chamber, which is shut off at its top, is opened.

5. In an apparatus for measuring liquids, the combination of a vessel divided into a plurality of chambers of different sizes, each of which is provided at its top with an air valve, which is normally open but closed automatically by the liquid raising the movable valve body when the chamber has been filled, an inlet valve at the top of the vessel, adapted to cut off communication with any one of the chambers and simultaneously establish communication with all the other chambers, and an outlet valve at the bottom of same, the said valves having a common spindle and a crank and arranged in such manner that one chamber only can be emptied and the other chambers are filled simultaneously, the said vessel being provided with a scale for adjusting the crank into the right position according to the quantity of the liquid to be tapped.

In witness whereof, I have hereunto signed my name in the presence of two subscribing witnesses.

GUSTAF TEODOR SUNDELIN.

Witnesses:
AXEL EHRNER,
HEDWIG MELINDER.

Copies of this patent may be obtained for five cents each, by addressing the "Commissioner of Patents, Washington, D. C."